(12) United States Patent
Challener et al.

(10) Patent No.: US 8,364,943 B2
(45) Date of Patent: Jan. 29, 2013

(54) S3 BIOS OPERATING SYSTEM SWITCH

(75) Inventors: David C. Challener, Raleigh, NC (US);
Daryl Cromer, Cary, NC (US); Justin T. Dubs, Durham, NC (US); Howard Locker, Cary, NC (US); James S. Rutledge, Durham, NC (US); Randall S. Springfield, Chapel Hill, NC (US); James J. Thrasher, Efland, NC (US); Michael T. Vanover, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 1096 days.

(21) Appl. No.: 12/040,829

(22) Filed: Feb. 29, 2008

(65) Prior Publication Data
US 2009/0222651 A1    Sep. 3, 2009

(51) Int. Cl.
*G06F 9/00* (2006.01)
(52) U.S. Cl. ............... 713/2; 713/1; 713/100; 713/300; 713/320; 713/323; 713/324
(58) Field of Classification Search .................. 713/1, 2, 713/300, 320, 323, 324, 100
See application file for complete search history.

(56) References Cited

U.S. PATENT DOCUMENTS

| | | | |
|---|---|---|---|
| 6,631,469 B1 * | 10/2003 | Silvester | 713/2 |
| 7,356,677 B1 * | 4/2008 | Rafizadeh | 713/1 |
| 7,383,450 B2 * | 6/2008 | Rothman et al. | 713/300 |
| 7,409,536 B2 * | 8/2008 | Guo et al. | 713/1 |
| 7,411,314 B2 * | 8/2008 | Dunstan | 307/64 |
| 7,529,923 B2 * | 5/2009 | Chartrand et al. | 713/2 |
| 7,702,733 B2 * | 4/2010 | Fleck et al. | 709/206 |
| 7,831,850 B2 * | 11/2010 | LeProwse et al. | 713/320 |
| 7,877,592 B2 * | 1/2011 | Sun et al. | 713/100 |
| 2004/0205755 A1 * | 10/2004 | Lescouet et al. | 718/100 |
| 2005/0066209 A1 * | 3/2005 | Kee et al. | 713/323 |
| 2005/0273663 A1 * | 12/2005 | Yoon | 714/36 |
| 2006/0136756 A1 * | 6/2006 | Rothman et al. | 713/300 |
| 2007/0005947 A1 * | 1/2007 | Chartrand et al. | 713/1 |
| 2007/0022258 A1 * | 1/2007 | Panabaker et al. | 711/149 |
| 2007/0128899 A1 * | 6/2007 | Mayer | 439/152 |
| 2008/0162866 A1 * | 7/2008 | Siddiqi et al. | 711/173 |
| 2008/0177994 A1 * | 7/2008 | Mayer | 713/2 |
| 2008/0209199 A1 * | 8/2008 | Sadovsky et al. | 713/2 |
| 2009/0086660 A1 * | 4/2009 | Sood et al. | 370/311 |
| 2009/0113458 A1 * | 4/2009 | Finger et al. | 719/327 |

* cited by examiner

*Primary Examiner* — Jaweed A Abbaszadeh
(74) *Attorney, Agent, or Firm* — Ference & Associates LLC

(57) ABSTRACT

Arrangements for employing a system BIOS (basic input/output system) to handle email during a suspended state (such as an "S3" state as will be better understood herebelow). Preferably, the BIOS is employed to "jump" between two suspended images such that, e.g., two more powerful OS's can be employed to manage the mail function.

22 Claims, 3 Drawing Sheets

S3 BIOS OPERATING SYSTEM SWITCH

FIELD OF THE INVENTION

The present invention relates generally to notebook computers and the like, and to methods and arrangements for managing electronic mail in such settings.

BACKGROUND OF THE INVENTION

Notebook computers (which may also alternatively be referred to as "notebooks", "laptops", "laptop computers" or "mobile computers" in the present discussion) generally are not as flexible and versatile with the handling of electronic mail as might be desired. One of the major impediments to better mail handling has been the fact that notebooks (and other personal computers), because of the power states normally employed (e.g., the system does not run when the lid is closed), cannot download mail when the system is suspended (e.g., when the lid is closed). However, the handling of mail in a suspended state would appear to be a great boon to notebook users as this would help replicate such a function as is known and employed in hand-held mobile devices (such as the "BLACKBERRY" devices manufactured by Research In Motion, Waterloo, Ont., Canada).

Accordingly, in view of the foregoing, a need has been recognized in connection with improving upon the mail handling capabilities of notebooks so as to expand their functionality in scenarios that, for one reason or another, have hitherto been off-limits.

SUMMARY OF THE INVENTION

In accordance with at least one presently preferred embodiment of the present invention, a system BIOS (basic input/output system) is employed to handle email during a suspended state (such as an "S3" state as will be better understood herebelow). Preferably, the BIOS is employed to "jump" between two suspended images such that, e.g., two more powerful OS's can be employed to manage the mail function.

In summary, one aspect of the invention provides a system comprising: a main memory; a hard drive; a BIOS; a first operating system; and a second operating system; the first operating system acting to download mail responsive to a first condition; the second operating system acting to download mail responsive to a second condition; the BIOS acting to activate the second operating system responsive to the second condition.

Another aspect of the invention provides a method comprising the steps of: downloading mail with a first operating system, responsive to a first condition; downloading mail with a second operating system, responsive to a second condition; and employing a BIOS to activate the second operating system responsive to the second condition.

Furthermore, an additional aspect of the invention provides a program storage device readable by machine, tangibly embodying a program of instructions executable by the machine to perform a method comprising the steps of: downloading mail with a first operating system, responsive to a first condition; downloading mail with a second operating system, responsive to a second condition; and employing a BIOS to activate the second operating system responsive to the second condition.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
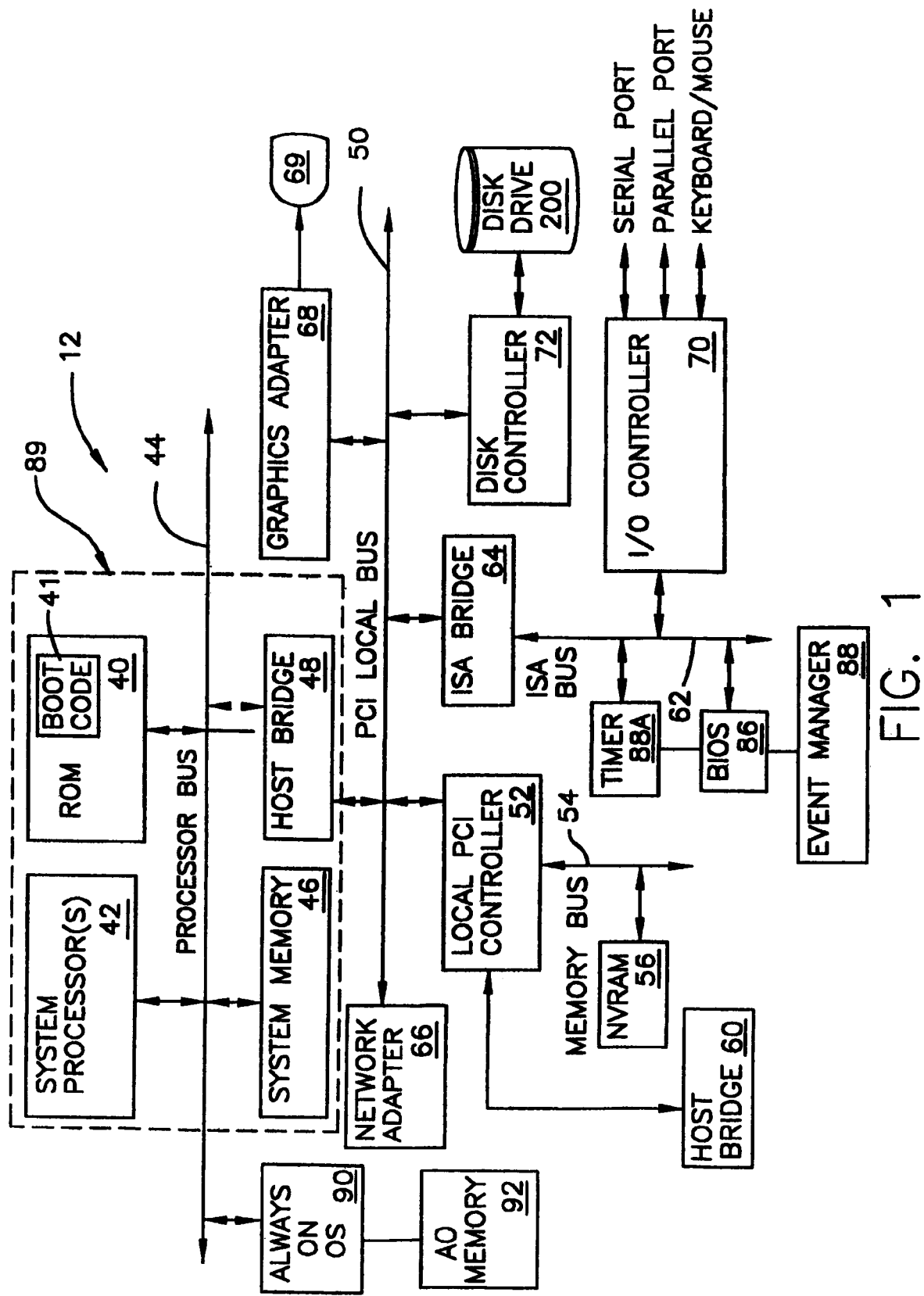
FIG. 1 schematically illustrates a computer system with added components.
Figure 2:
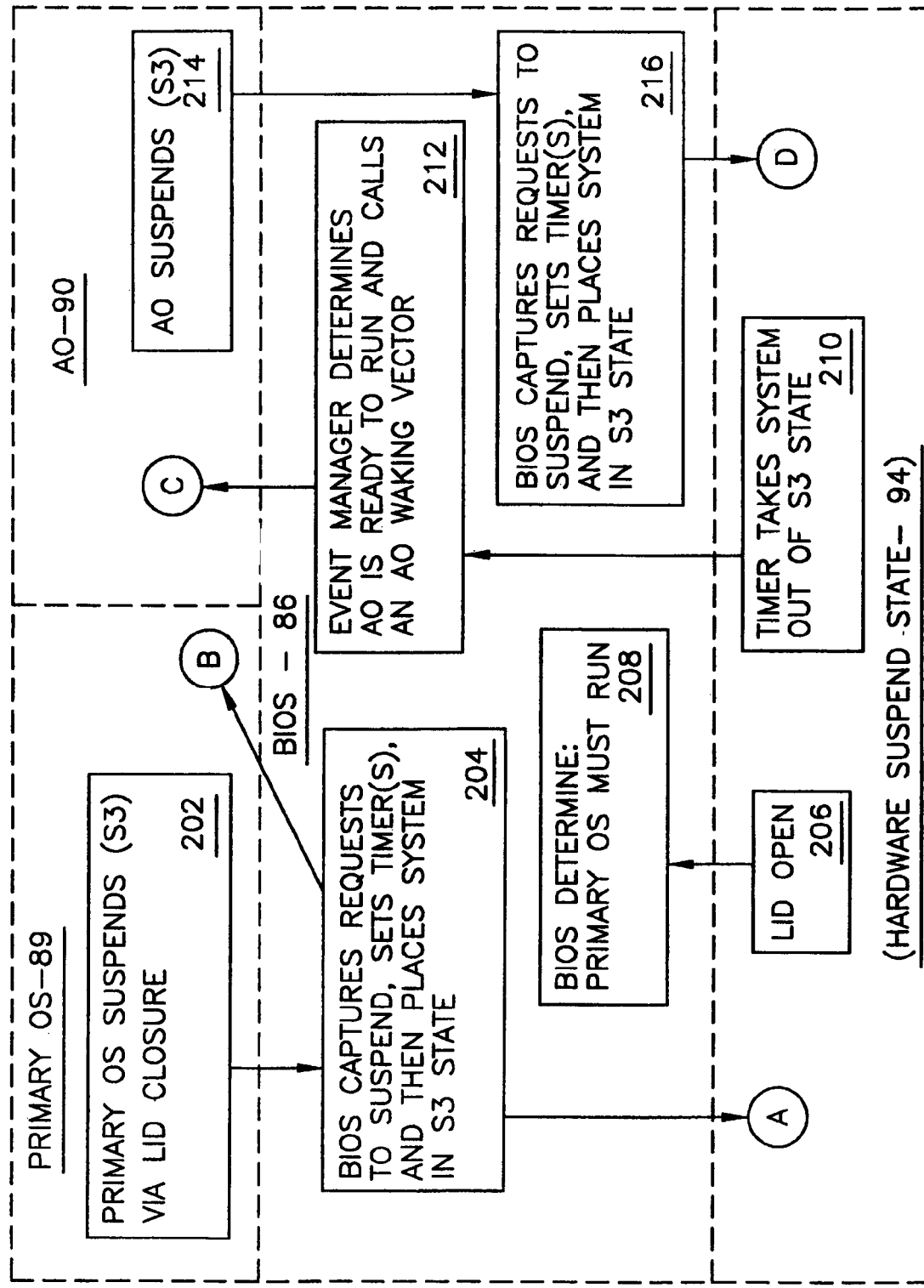
FIG. 2 schematically illustrates data flows.
Figure 3:
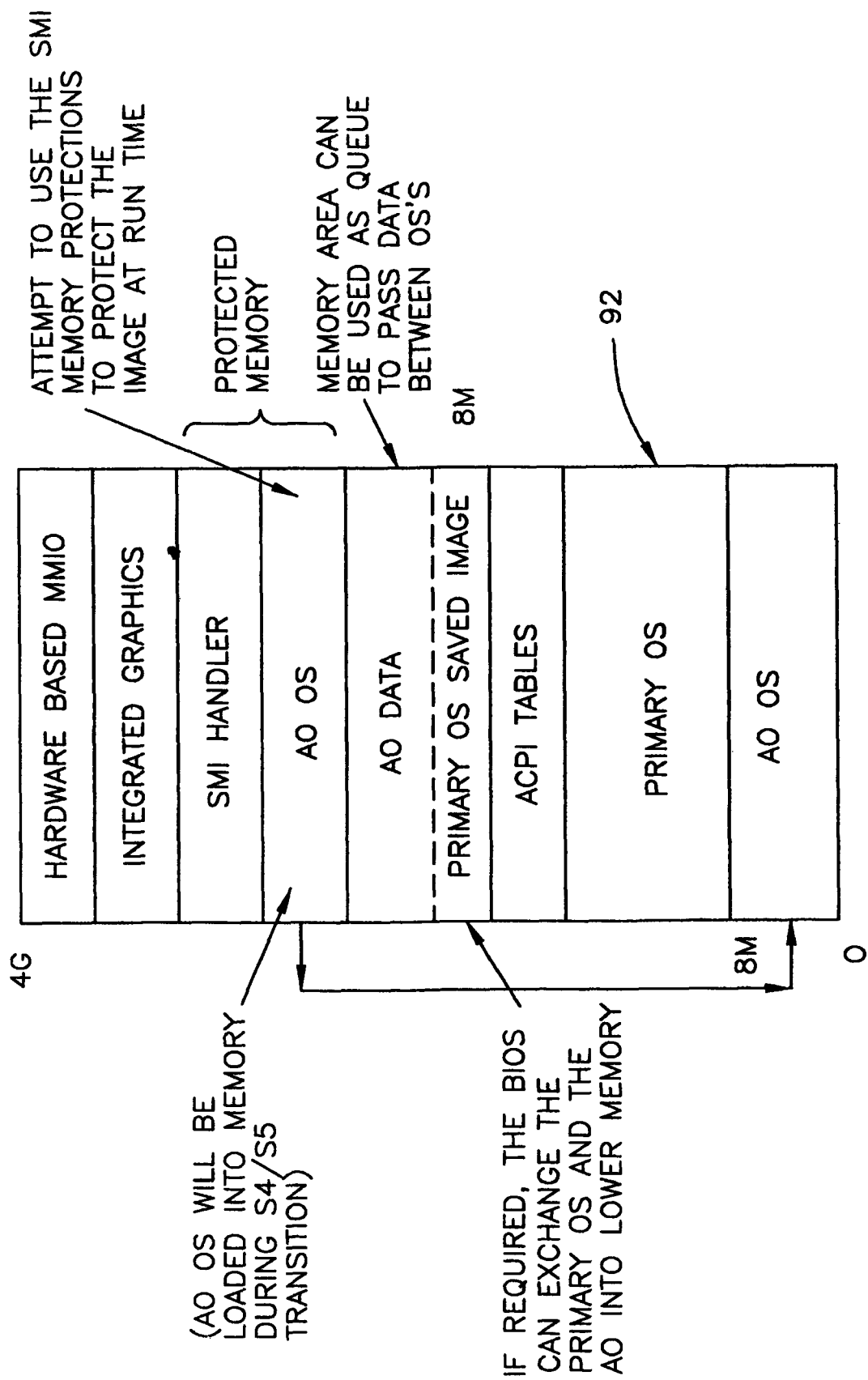
FIG. 3 schematically illustrates an "always on" physical memory map.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1-3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

Indicated at 86 is a BIOS (basic input/output system) whose functioning, in accordance with at least one presently preferred embodiment of the present invention, will be better understood from further discussion herebelow.

In accordance with at least one presently preferred embodiment of the present invention, BIOS 86 is employed to handle email during a suspended state (such as an "S3" state). Preferably, the BIOS 86 is employed to "jump" between two suspended images such that, e.g., two more powerful OS's can be employed to manage the mail function. Essentially, since the BIOS 86 may not have the strength of function to perform an email handling task as contemplated, the jumping between two suspended images becomes very desirable.

Normally, a standby state (often referred to as an "S3" state) equates to a complete system shutdown, except for memory. Thus, in an S3 or standby state (which terms will heretofore be used and can be understood interchangeably) the memory (e.g., system memory 46 in FIG. 1) remains coherent while other system elements are not. Such a state often prevails when, without actually shutting down a notebook system, a distinct physically act takes place such as the closing of the notebook lid. This state contrasts with what is commonly known as "S4", or "hibernate", and "S5", or "power off". S4/hibernate relates to a low battery state when, to avoid a degree of system corruption that might otherwise occur when battery power completely runs out, all open applications are rolled out to a file on the hard drive without being retained in system memory per se. S5 or power off, essentially, relates to complete system shutdown. S3/standby particularly contrasts with S4/hibernate in that the former normally involves a much faster resume time, e.g., when the lid is reopened; on the other hand, resuming a system from hibernation/S4 is typically a longer and more inconvenient process. Herein, the terms "S3" and "standby" and "suspend", and their derivatives, should be understood as being interchangeable with each other for the purposes of discussion, as should the pair of terms "S4" and "hibernate" (and their derivatives) as well as the pair of terms "S5" and "power off" (and their derivatives).

In accordance with at least one presently preferred embodiment of the present invention, and in a manner to be better understood and appreciated herebelow, mail may be managed and handled via the intervention of system BIOS 86 in two operating systems (OS's). Preferably, a first OS will download the mail when the system is active. Then, when the system is suspended, as in a S3/standby state, the second OS will preferably be activated periodically (e.g., by policy) to read the mail into memory. This second OS will be protected by the BIOS's bus master interface (BMI) memory protection facilities in such a way that the mail will be secure in memory.

Preferably, the first OS as mentioned above is a "primary" or "main" OS as normally employed by the system (indicated by the dotted box at 89 as normally encompassing components 40, 41, 42, 46 and 48) while the second OS can be embodied by an Always On Operating System (AO OS, or "AO"), indicated at 90. Preferably, an AO image will be placed in its own memory 92 during a transition between S4 (or hibernate) and S5 (or power off) states. (Generally, the AO OS is optimized just to handle email so it runs like a "BLACKBERRY", particularly with low power as compared to the primary OS.) When the primary OS 89 goes into standby or S3 State, the AO 90 will preferably be periodically powered on to allow the AO 90 to save mail in memory 92. (Thus, at this point the AO OS will get mail from the mail server.) When the AO 90 has completed such a task, it preferably will suspend (go into S3). The BIOS will then preferably "bounce" between the two suspended images (or images in S3). As such, preferably, BIOS 86 will include, or be in communication with, an event manager 88 which determines which of the two OS's (primary and AO) will be started in accordance with timer events. (As such, a timer 88a is preferably in communication with BIOS 86 and system 12 and acts to prompt switching between images in S3 in a manner to be better understood herebelow.)

Preferably, the AO 90 and BIOS 86 will process normal wake events that occur while the AO 90 is running. Should such a wake event occur (for instance, opening the lid), the AO 90 will preferably be suspended and the primary OS 89 will be started.

The AO 90 should preferably be configured to support a ACPI (advanced configuration and power interface) to control, as known, thermals and acoustics as well as the suspend states.

The AO 90 can be embodied by essentially any suitable operating system that is capable of functioning as described herein, e.g., a "WINDOWS CE" or "WINDOWS PE" system, or a "LINUX" system. The AO 90 can be provided in the form of a system card or in essentially any other suitable form, such as via components already in the computer (e.g., a portion of a hard drive).

In view of the foregoing, FIG. 2 schematically illustrates data flows in accordance with a preferred embodiment of the present invention. Primary OS 89, AO 90, BIOS 86 are all indicated by large dotted boxes, as is a "hardware suspend state" at 94 (relating to an S3/suspend state of system 12 from FIG. 1). Different flows are depicted, each relating to a different scenario, with termini of each flow indicated with a circle a, b, c or d. Accordingly, if the primary OS 89 is in operation and the notebook lid closes (202), this prompts (as is well-known) a suspend or S3 state of the primary OS 89. Preferably, then, at 204, BIOS 86 captures the requests to suspend, sets or resets one or more timers (e.g., timer 88a from FIG. 1), and then places the system at large in an S3 state (at a).

In accordance with another data flow, hardware suspend state 94 may be terminated if, e.g., the notebook lid opens (206). (It should be noted that the closing and opening of a notebook lid presents but one illustrative and non-restrictive example of the type of intended action that may initiate or end a suspend state, and that any mention of a lid opening or closing herein can be regarded as encompassing a very wide variety of other intended acts that yield a similar result.) In response to this, BIOS 86 preferably determines that the primary OS 89 must run, and then prompts primary OS 89 to run (b).

In accordance with a preferred embodiment of the present invention, AO 90 may be activated under given conditions, thus permitting BIOS 86 to switch between images in the primary OS 89 and AO 90 as touched on heretofore. Accordingly, if a timer (e.g., 88a in FIG. 1) terminates a system suspend state (210), then (at 212) the event manager (e.g., 88 in FIG. 1) associated with BIOS 86 will determine that AO 90 is ready to run and will call an AO waking vector, thereby prompting AO 90 to run (c). Finally, if for any reason AO 90 suspends (214), then at 216 BIOS 86, as with step 204, will preferably capture the requests to suspend, sets or resets one or more timers (e.g., timer 88a from FIG. 1), and then places the system at large in an S3 state (at d). It should be noted that steps 210-216 can by cycled through multiple times.

The data flows illustrated in FIG. 2 assume that the system has already been initialized and booted. While these acts can be undertaken in essentially any suitable matter, in accordance with a presently preferred embodiment of the present invention, the AO is loaded during initialization only after real mode memory has been saved. The AO is then preferably suspended, and the AO image is put in a mode where it can be called out of S3/suspend. Finally, the AO image is preferably moved to a reserved space, e.g., on the hard disk drive. Booting, on the other hand, preferably involves saving the AO image into memory followed by a loading of the primary OS.

FIG. 3 schematically illustrates an "always on" physical memory map that may be employed in accordance with a preferred embodiment of the present invention. For a 32 bit processor, the maximum accessible memory size is 4 Gigabyte. The chart illustrates that the data structures will be kept at the top of memory. 8 Megabyte is an sample size of the AO and is only used as here as an illustrative and non-restrictive example. "4G", in the drawing, is the actual physical address of the top item in the memory map and "8M" relates to how much memory is in each slot.

As shown, the AO memory 92 may include the following components if processes and data flows in accordance with a preferred embodiment of the present invention are carried out: a hardware-based memory mapped I/O (MMIO), integrated graphics, an SMI handler, and the AO OS which may preferably be loaded into memory during a transition between S4 and S5 states. SMI memory protections may be used to protect the AO OS image at run time. Particularly, since SMI has access to all memory, there is a potential that a virus could take over this memory and create harm. Because of this, there are hardware protections which, after initialization, protect the SMI memory from access by anyone other than the SMI handler. These protections go away in accordance with the Sx states and the BIOS then needs to reestablish protection. Because of this, the BIOS can use the protection capability to also shield the AO OS from corruption.

Other components in the memory 92 may include AO data (which can be used as a queue to pass data between the two OS's), the primary OS saved image, ACPI tables, the primary OS and, again, the OS. If required, the BIOS can exchange the primary OS and the AO into lower memory. If the AO needs to run in lower memory (i.e., needs access to interrupt handlers), the BIOS would need to swap the AO and the lower part of the Primary OS. This would occur in the transition (212) and only needs to happen if the AO needs access to lower memory. On transitioning back to the Primary OS, the BIOS (208) would swap again so memory would not be changed in the swapping states.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A system comprising:
    a main memory storing a first operating system and a second operating system in a standby state;
    a hard drive; and
    a BIOS configured to:
    periodically activate to an active state the second operating system while maintaining the first operating system in the standby state;
    said first operating system acting to download mail responsive to a first condition;
    said second operating system acting to download mail responsive to a second condition;
    said BIOS acting to activate said second operating system responsive to the second condition.

2. The system according to claim 1, wherein the first condition corresponds to the system being active.

3. The system according to claim 1, wherein the second condition relates to the system being in a standby state.

4. The system according to claim 3, wherein the second condition further corresponds to a temporal prompt.

5. The system according to claim 3, said further comprising a timer which prompts said BIOS to activate said second operating system periodically.

6. The system according to claim 3, wherein said second operating system acts to download mail into a memory.

7. The system according to claim 1, wherein said first operating system comprises a primary operating system.

8. The system according to claim 1, wherein said second operating system comprises an always on operating system.

9. The system according to claim 1, wherein during a standby state said BIOS selectively accesses a first image, associated with said first operating system, and a second image, associated with said second operating system.

10. The system according to claim 9, further comprising an event manager in communication with said BIOS, said event manager acting to selectively prompt a starting of said first operating system in accordance with a first criterion and of said second operating system in accordance with a second criterion.

11. The system according to claim 1, wherein said system comprises a notebook computer system.

12. A method comprising the steps of:
storing in memory a first operating system and a second operating system in a standby state;
using a BIOS to periodically activate to an active state the second operating system while maintaining the first operating system in the standby state;
downloading mail with the first operating system, responsive to a first condition;
downloading mail with the second operating system, responsive to a second condition; and
employing a BIOS to activate the second operating system responsive to the second condition.

13. The method according to claim 12, wherein the first condition corresponds to the system being active.

14. The method according to claim 12, wherein the second condition relates to the system being in a standby state.

15. The method according to claim 14, wherein the second condition further corresponds to a temporal prompt.

16. The method according to claim 14, further comprising the step of prompting the BIOS to activate the second operating system periodically.

17. The method according to claim 14, wherein said downloading of mail via a second operating system comprises downloading mail into a memory.

18. The method according to claim 12, wherein the first operating system comprises a primary operating system.

19. The method according to claim 12, wherein the second operating system comprises an always on operating system.

20. The method according to claim 12, further comprising, during a standby state, selectively accessing a first image with the BIOS and selectively accesses a second image with the BIOS, the first image being associated with the first operating system and the second image being associated with the second operating system.

21. The method according to claim 20, further comprising the step of selectively prompting a starting of the first operating system in accordance with a first criterion and of the second operating system in accordance with a second criterion.

22. A program storage device readable by machine, tangibly embodying a program of instructions executable by the machine to perform a method comprising the steps of:
storing in memory a first operating system and a second operating system in a standby state;
using a BIOS to periodically activate to an active state the second operating system while maintaining the first operating system in the standby state;
downloading mail with the first operating system, responsive to a first condition;
downloading mail with the second operating system, responsive to a second condition; and
employing a BIOS to activate the second operating system responsive to the second condition.

* * * * *